Patented June 22, 1926.

UNITED STATES PATENT OFFICE.

OSCAR F. HEDENBURG, OF PITTSBURGH, PENNSYLVANIA, ASSIGNOR TO FRANK O. MOBURG, OF TOLEDO, OHIO.

FUNGICIDE COMPOSITION.

No Drawing. Application filed January 18, 1921. Serial No. 438,237.

This invention relates to improved fungicide compositions and methods of producing them.

Copper compounds are commonly used for fungicidal purposes, particularly in the form of Bordeaux mixture, made from copper sulfate and lime, but such compositions contain the copper in an insoluble form. Bordeaux mixture, however, is not suitable for use on certain kinds of foliage, or during certain seasons, because of its defoliating action upon certain kinds of foliage, and its tendency to spot certain fruit, such as apples.

It has also been proposed to make solutions of copper salts, for example, by dissolving copper carbonate in a solution of ammonia or of ammonium carbonate, but such solutions are inconvenient and expensive to ship, and, if evaporated to dryness, give a copper compound which is insoluble.

The present invention relates to an improved fungicide composition, in a solid state, containing copper which is completely, or for the most part, readily soluble in water, and which is well adapted for storage and shipment and which enables predetermined and definite amounts of copper in solution to be readily obtained for spraying purposes.

The present invention also includes, in combination, the new fungicide composition in a storage and shipment container sealed against the atmosphere, whereby the composition can be preserved for long periods of time without objectionable depreciation of its active fungicidal properties or its ready solubility in water.

The present invention is based upon the discovery that ordinary commercial copper carbonate (basic copper carbonate) will react with commercial ammonium carbonate, with evolution of carbon dioxide, or in the presence of an agent (such as ammonia, lime, sodium carbonate, etc.) which will combine with carbon dioxide, to form a cuprammonium compound or composition which is readily soluble, or for the most part soluble, in water, even in such extreme dilutions as are utilized for spraying purposes (e. g., a solution containing copper equivalent to 5 ounces of copper carbonate in 50 gallons of water). The composition can thus be produced directly in a solid form, without dissolving the reacting ingredients in water, and with only such moisture present as may be contained in, or formed from, the reagents themselves, as they are found in commerce, or such as commonly occurs in the atmosphere. While the copper carbonate itself is insoluble or substantially insoluble in water, nevertheless, by the reaction upon the copper carbonate of ammonium carbonate, or of ammonia in the presence of ammonium carbonate, the solid insoluble copper carbonate is converted into a cuprammonium carbonate compound, which is likewise a solid, but which is nevertheless readily soluble, or for the most part soluble, directly in water.

The present invention includes different fungicide compositions, as well as different methods of production, hereinafter more fully set forth.

The copper carbonate used in making the new compositions of the present invention may be the ordinary copper carbonate of commerce, i. e., the green basic copper carbonate, which I have found well adapted for use. Other suitable forms of copper carbonate may, however, be similarly used, particularly the blue basic copper carbonate.

The ammonium carbonate or carbonate of ammonia used in making the new compositions may also be the commercial ammonium carbonate [the double salt of ammonium hydrogen carbonate and ammonium carbamate $(NH_4HCO_3.NH_4CO_2NH_2)$], although other available forms of ammonium carbonate can also be used, such as normal ammonium carbonate, ammonium hydrogen carbonate, or ammonium sesquicarbonate.

The new compositions can be made from the copper carbonate and the ammonium carbonate by various methods of procedure, and with the production of compositions which vary or may vary with the method of production.

The preferred and advantageous method of production of the new fungicide composition is to intimately mix the copper carbonate, the ammonium carbonate, and a substance which will combine with carbon dioxide, such as powdered or hydrated lime, magnesia or magnesium hydroxide, normal sodium carbonate, etc. This method and other methods of production will be further illustrated by the following specific examples, the parts being by weight:

*Example I.*—5 parts of copper carbonate (green basic copper carbonate), 15 parts of commercial ammonium carbonate and 12 parts of hydrated lime are intimately mixed. The ingredients should preferably be used in a finely divided state, and, if they are not aleady in this state, they may be finely ground before use. So also, the ingredients may be ground together, for example, the copper carbonate can be ground with the ammonium carbonate or with the ammonium carbonate and hydrated lime. The grinding operation will produce smaller particles which will offer relatively more surface for reaction. The ammonium carbonate is readily decomposed, and this decomposition takes place to some extent even under ordinary atmospheric conditions. The ammonia, or a part of the ammonia, of the ammonium carbonate, appears to combine with the copper carbonate to form a cuprammonium carbonate, while the carbon dioxide of the decomposed ammonium carbonate will combine with the hydrated lime to form calcium carbonate. The reaction which takes place, and the particular composition of the cuprammonium carbonate formed, is somewhat obscure, and I do not desire to limit myself by any theoretical explanation or discussion of the reaction and the particular composition of the product, e. g., whether or not the compound is a basic cuprammonium compound or a mixture of compounds. I have found, however, that by treating insoluble copper carbonate in the manner above described, a cuprammonium carbonate composition is formed in which the copper is for the most part readily soluble in water, even in solutions of extreme dilution, such as are used for spraying purposes.

*Example II.*—The proportions of the ingredients given in Example I can be somewhat varied. A satisfactory composition can thus be made from 5 parts of the copper carbonate, 9 parts of commercial ammonium carbonate, and 2 parts of hydrated lime. The reaction in this case, as in the case of Example I, will take place at ordinary temperatures, if the ingredients are intimately mixed and are permitted to stand for a sufficient period of time; although the reaction can be somewhat hastened by heating to initiate the reaction. The reaction is itself an exothermic reaction and considerable heat is given off during its progress. During the progress of the reaction, as above noted, the ammonium carbonate is, to a greater or less extent, decomposed into ammonia, carbon dioxide and water. Owing to this decomposition of the ammonium carbonate and the formation of gases therefrom, as well as the expansion of the air due to the heat of reaction, the reaction should be carried out in closed containers, and preferably containers able to withstand, with safety, a considerable pressure; and unless the reaction is carried out in containers able to withstand considerable pressure, the reaction should be so moderated or regulated that excessive pressure will not be developed.

*Example III.*—Instead of using hydrated lime to combine with the carbon dioxide, set free from the ammonium carbonate, ammonia gas may be introduced, preferably together with a little water in the form of water vapor or steam. The ammonia so introduced may react directly with the copper carbonate, as well as with the carbon dioxide set free by decomposition, forming further amounts of ammonium carbonate which may also take part in the reaction. A mixture of 5 parts of copper carbonate and 9 parts of ammonium carbonate can thus be treated with about 2 parts of ammonia gas together with a little admixed moisture, to produce a cuprammonium carbonate composition which will differ somewhat from the compositions produced according to Examples I and II. It will thus be free from calcium carbonate and any excess hydrated lime, and will be correspondingly richer in soluble copper content per unit of weight. The introduction of ammonia gas in the manner described causes the reaction to take place readily and with the evolution of considerable heat. The progress of the reaction can be somewhat regulated by the rate of addition of the ammonia gas. The proportions of the ingredients, in this example, as well as in the other examples, is capable of some variation.

*Example IV.*—Instead of adding ammonia to a mixture of copper carbonate and ammonium carbonate, a mixture of copper carbonate and ammonium carbonate can be directly used without further addition. For example, 5 parts of the copper carbonate and 11 parts of commercial ammonium carbonate can be intimately mixed and caused to react, perferably by heating to a moderate temperature. A part of the carbon dioxide is, in this case, evolved in a gaseous state, together with more or less water vapor, and some small amounts of ammonia, although the greater part of the ammonia will be present in a combined state in the final product. Where small amounts of ammonia escape with the carbon dioxide, these gases will tend to recombine on cooling to give ammonium carbonate which can be recovered and reused.

*Example V.*—Instead of using hydrated lime for combining with carbon dioxide, as in Example I and II, normal sodium carbonate can be similarly used, and is particularly advantageous. For example, 5 parts of the copper carbonate (using the green basic copper carbonate, the same as in the other examples), 6½ parts of commercial ammonium carbonate and 4½ parts of sodium carbonate (soda ash) can be intimately mixed and the reaction initiated by moderate heating, for example, to a temperature of 40° to 45°. The reaction results in the production of a cuprammonium carbonate compound or composition containing the copper in a form readily soluble in water. The proportions of ingredients can be somewhat varied in this case, as in the other examples.

While the copper carbonate used in the processes of the foregoing examples is itself substantially insoluble in water, nevertheless, the reaction products produced by the reaction of ammonia thereon, in the presence of ammonium carbonate, results in converting the copper, for the most part, or completely, into a readily soluble cuprammonium compound which is thus directly produced in a solid state. The reaction of the ammonia upon the copper carbonate brings about a change from the green color of the basic copper carbonate to a deep blue color, which may vary somewhat, for example, with the admixture of varying amounts of substances such as calcium carbonate or hydrated lime.

While the proportions of the ingredients are capable of some variation, it is advantageous to use such proportions that a definite or predetermined amount of the composition, for example, one or two pounds, will contain an appropriate amount of copper for use in say 50 gallons of water. For example, 2 pounds of the composition produced according to Example I, or 1 pound of any of the compositions produced according to Examples II, III, IV or V, can be added to 50 gallons of water to form a solution containing copper, equivalent to about 5 ounces of copper carbonate, in solution, or for the most part in solution, therein. A small part of the copper may be precipitated from solution, but the copper so precipitated, for example, when lime is used as in Examples I and II, is precipitated in an exceedingly fine flocculent state, which readily stays in suspension, and can be sprayed on the foliage with the solution. When the solution is used as a spray upon foliage, the drying of the solution gives an adherent film of copper compounds. The solution, moreover, is free from the objectionable action upon certain kinds of foliage which may be produced by Bordeaux mixture.

The new fungicide compositions of the present invention are particularly advantageous for use in fungicidal sprays, for the reason that the copper is, for the most part or completely, contained in solution and can thus be uniformly distributed upon the foliage.

The composition of the present invention is also well adapted for use with lead arsenate, particularly the compositions of Examples I and II, for example, by adding both lead arsenate and the composition to the water to form a composite spray liquor, so that both the copper-containing fungicide composition and the lead arsenate can be applied by a single spraying operation.

The new fungicide compositions of the present invention have the advantage that, when used as a spray, the drying of the spray film is accompanied by removal of ammonia, and results in the formation of a more or less gelatinous and adherent coating or covering of insoluble copper compounds.

In order to conserve the new compositions in substantially their original efficacy and solubility, I protect them from the atmosphere by enclosing them in a sealed container, so that they are acted upon only by such gases as are generated by the composition itself. The compositions are thus preserved, so to speak, in a self-generated atmosphere, which preserves the compositions from objectionable decomposition, so that they can be kept in a highly active and readily soluble state until they are desired for use. Various forms and sizes of containers are available for use, which will enable the compositions to be sealed therein, in their self-generated atmosphere. Air tight cans such as are used in packaging calcium carbide and varnishes may be used as containers. These cans have a round hole in the top which is closed by a lid which fits tightly into the hole and forms an air tight seal. The invention is, of course, not limited to any particular type of can or sealing means and any container which provides for an air tight joint may be used. Predetermined amounts of the composition can thus be separately packaged so that, for example, a package containing 8 pounds of the composition of Example I, or 4 pounds of the compositions of Examples II, III, IV or V, can be used for a 200-gallon tank of water to form a solution containing copper equivalent to about 5 ounces of copper carbonate to 50 gallons of water. Larger or smaller packages can similarly be supplied for larger or smaller amounts of water or to produce solutions of increased or decreased copper content. The packages containing the composition sealed therein may be appropriately labeled, for example, to indicate the amount of water to which the composition should be added to give a predetermined amount of copper therein.

It will thus be seen that the present invention includes not only certain improvements in fungicidal compositions which vary somewhat from each other, but also improvements in various methods of producing such compositions, as well as improvements in the packaging of such compositions and in the resulting packages containing the compositions sealed in a self-generated atmosphere.

The improved composition of the present invention, when properly preserved until used, can be used in much the same manner as solutions made by dissolving copper carbonate directly in solutions containing ammonia or ammonium carbonate, and with similar advantages; while the present invention presents the important advantage, among others, that the composition is provided in a solid and relatively dry state, which can be readily handled, shipped and stored and which, when suitably preserved in the manner described, will have a predetermined available copper content, and which can thus be used in a simple and advantageous manner merely by adding a predetermined amount of the conserved composition to the spray tank and by applying the spray in the usual way.

In the claims the expression "cuprammonium carbonate composition" is used to cover the reaction product of copper carbonate and ammonium carbonate and is not limited to the formation of a single chemical compound but covers the reaction product whether they consist of a single chemical compound or a mixture of chemical compounds.

I claim:

1. A fungicide composition, comprising a cuprammonium carbonate composition in a substantially dry solid state which is readily soluble, at least for the most part in cold water.

2. A fungicide composition, comprising a reaction product of copper carbonate and ammonia in the presence of ammonium carbonate, said product being a substantially dry solid product which is readily soluble, at least for the most part in cold water.

3. A fungicide composition, comprising the reaction product of copper carbonate and ammonium carbonate, in a substantially dry solid state, said composition being readily soluble, at least for the most part, in cold water.

4. The method of producing a substantially dry solid fungicide composition readily soluble in cold water which comprises causing ammonia gas to react of copper carbonate in the presence of ammonium carbonate in a solid state, whereby the composition is directly produced in a solid state.

5. The method of producing a fungicide composition, which comprises causing substantially dry solid copper carbonate and ammonium carbonate to react with evolution of carbon dioxide, whereby the composition is directly produced in a solid state.

6. The method of producing a fungicide composition, which comprises causing substantially dry solid copper carbonate and ammonium carbonate to react with evolution of carbon dioxide in the presence of an agent capable of combining with the carbon-dioxide, whereby the composition is directly produced in a solid state.

In testimony whereof I affix my signature.

OSCAR F. HEDENBURG.